(12) United States Patent
Boada et al.

(10) Patent No.: US 11,106,999 B2
(45) Date of Patent: *Aug. 31, 2021

(54) AUTOMATIC SEGMENTATION OF A COLLECTION OF USER PROFILES

(71) Applicant: International Business Machines Corporation, Armonk, NY (US)

(72) Inventors: Jason W. Boada, Danbury, CT (US); Sophia Krasikov, Katonah, NY (US); Harini Srinivasan, Somers, NY (US); Aditya Vempaty, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/859,554

(22) Filed: Dec. 31, 2017

(65) Prior Publication Data
US 2018/0240042 A1    Aug. 23, 2018

Related U.S. Application Data

(63) Continuation of application No. 15/440,303, filed on Feb. 23, 2017.

(51) Int. Cl.
*G06N 20/00* (2019.01)
*G06F 17/18* (2006.01)
(Continued)

(52) U.S. Cl.
CPC ........... *G06N 20/00* (2019.01); *G06F 16/285* (2019.01); *G06F 16/9024* (2019.01);
(Continued)

(58) Field of Classification Search
CPC ... G06N 20/00; G06F 16/285; G06F 16/9024; G06F 17/11; G06F 17/18; G06Q 30/02; G06Q 50/01; H04L 64/306
See application file for complete search history.

(56) References Cited

U.S. PATENT DOCUMENTS 8,510,658 B2   8/2013  Priyadarshan
9,002,726 B2   4/2015  Pyhalammi et al.
(Continued)

FOREIGN PATENT DOCUMENTS

WO    WO2011082496 A1    7/2011

OTHER PUBLICATIONS

Ma et al., Effective Missing Data Prediction for Collaborative Filtering, SIGIR 2007 Proceedings, pp. 39-46, 2007. (Year: 2007).*
(Continued)

*Primary Examiner* — Kamran Afshar
*Assistant Examiner* — Marshall L Werner
(74) *Attorney, Agent, or Firm* — Joseph Petrokaitis; Otterstedt, Wallace & Kammer, LLP

(57) ABSTRACT

A method for generating an output comprising one or more segments includes obtaining a plurality of profiles derived from unstructured data associated with a plurality of users, wherein a given one of the profiles corresponds to a respective one of the users; repetitively executing at least one machine learning technique on the plurality of profiles, each execution producing a respective set of one or more segments from the plurality of profiles; generating a complete graph by performing pairwise comparisons between sets of segments from respective executions; applying at least one persistency graph algorithm to the complete graph to find one or more coherent clusters comprising one or more segments that are persistent across the repetitive executions of the machine learning technique; and producing the output at least in part by selecting at least one of the segments from at least one of the coherent clusters.

19 Claims, 7 Drawing Sheets

(51) Int. Cl.
*H04L 29/08* (2006.01)
*G06F 17/11* (2006.01)
*G06F 16/28* (2019.01)
*G06F 16/901* (2019.01)
*G06Q 50/00* (2012.01)
*G06Q 30/02* (2012.01)

(52) U.S. Cl.
CPC ............ *G06F 17/11* (2013.01); *G06F 17/18* (2013.01); *G06Q 30/02* (2013.01); *G06Q 50/01* (2013.01); *H04L 67/306* (2013.01)

(56) References Cited

U.S. PATENT DOCUMENTS

| | | | |
|---|---|---|---|
| 9,787,838 B1* | 10/2017 | Lembersky | G06F 40/30 |
| 2009/0125377 A1 | 5/2009 | Somji et al. | |
| 2012/0166285 A1 | 6/2012 | Shapiro et al. | |
| 2014/0172855 A1* | 6/2014 | Arnoux | G06Q 10/10 |
| | | | 707/737 |
| 2015/0287091 A1* | 10/2015 | Koran | G06Q 30/0277 |
| | | | 705/14.66 |
| 2016/0110442 A1* | 4/2016 | Williams | G06Q 10/0637 |
| | | | 707/737 |
| 2016/0232575 A1* | 8/2016 | Kirti | G06Q 30/0275 |
| 2017/0098245 A1* | 4/2017 | Palanciuc | G06Q 30/0266 |

OTHER PUBLICATIONS

Pontecorvi et al., Disjoint Cycles Intersection a Set of Vertices, pp. 1-8, May 2012. (Year: 2012).*

D.M. Blei et al., "Latent Dirichlet Allocation," Journal of Machine Learning Research, v.3, p. 993-1022, 2003.

J. Lin, "Divergence Measures Based on the Shannon Entropy," IEEE Transactions on Information Theory, v.37, n.1, Jan. 1991, p. 145-151.

Jason W. Boada et al., unpublished U.S. Appl. No. 15/440,303, filed Feb. 23, 2017, Automatic Segmentation of a Collection of User Profiles, pp. 1-25 plus 7 sheets of drawings.

Paul J. Otterstedt, List of IBM Patents or Patent Applications Treated as Related, Jun. 22, 2018, pp. 1-2.

* cited by examiner

700

AUTOMATIC SEGMENTATION OF A COLLECTION OF USER PROFILES

CROSS-REFERENCE TO RELATED APPLICATIONS

This application is a continuation of U.S. patent application Ser. No. 15/440,303 filed Feb. 23, 2017, the complete disclosure of which is expressly incorporated herein by reference in its entirety for all purposes.

BACKGROUND

The present invention relates to the electrical, electronic and computer arts, and, more particularly, to categorization of user data.

A tremendous amount of unstructured data has been generated by services such as Twitter®, Facebook®, Foursquare®, etc. (Twitter® is a registered trademark of Twitter, Inc. Facebook® is a registered trademark of Facebook, Inc. Foursquare® is a registered trademark of Foursquare Labs, Inc.) A popular form of such unstructured texts is a Twitter® user's short text message (a "tweet"): Twitter® users can post "tweets" on a variety of topics and life events.

Automatic recognition of user demographics, behavior, and interests from social media data allows for the creation of social media profiles (i.e. profiles generated from available data, as opposed to personal profiles, which are created by users themselves). Business organizations are increasingly recognizing the importance of social media profiles in monitoring trends and personalizing marketing to potential customers and users. Applications built on such generated social media profiles can also serve a broad range of military and security needs.

In fields such as retail, finance, broadcasting, as well as other market contexts, various methods do exist to categorize sub-populations of a population according to particular profile attributes, such as demography, behavior and activities. One common method is segmentation, wherein a segment is a collection of users having common behavioral, demographic or interest attributes. The objective of segmentation is to create sub-populations that allows businesses to analyze and target those sets more effectively than if targeting individuals.

A defined set, or sub-population—referred to herein as a "segment"—may be targeted with content relevant to the profile attributes of users in that segment. Segments can be generated along composite profile attributes like "demographic-behavior-interest"; different segments can have different "confidence levels" for each attribute in the segment. For example, a segment of 50+-year-old skiers can have a confidence level for age of 0.8 (80% accuracy) and a 0.4 confidence level for interest in skiing.

Targeted content for a segment can include advertisements, web site links, and links to social media groups a user may find of interest. For example, users in a segment with attributes of a certain age, parental status, and income level may be targeted with content regarding colleges and other education options for their children.

Various methods exist to generate profiles of users from some given or collected data for a pre-defined set of attributes. Methods also exist to take user profiles (with pre-defined attributes) and segment them into groups of users.

SUMMARY

An embodiment includes a method for generating an output comprising one or more segments. The method includes obtaining a plurality of profiles derived from unstructured data associated with a plurality of users, wherein a given one of the profiles corresponds to a respective one of the users. The method also includes repetitively executing at least one machine learning technique on the plurality of profiles, each execution producing a respective set of one or more segments from the plurality of profiles. The method further includes generating a graph by performing pairwise comparisons between sets of segments from respective executions. The method also includes applying at least one persistency graph algorithm to the graph to find one or more coherent clusters comprising one or more segments that are persistent across the repetitive executions of the machine learning technique. The method further includes producing the output at least in part by selecting at least one of the segments from at least one of the coherent clusters.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Profile segmentation often relies on techniques applicable to the problem of unsupervised clustering in machine learning. However, many standard clustering techniques (e.g., k-means, principal component analysis, etc.) do not work well on extremely sparse sets such as user profile data. Furthermore, many of these conventional techniques require domain experience to set hyper-parameter values (e.g., the number of clusters/dimension of the latent space to use) and/or to recognize if the result acquired is a good fit. Thus, current segmentation systems require an end-user client to provide rules for segmenting profiles into pre-defined groups.

By contrast, illustrative embodiments of the present invention advantageously eliminate the need for a client to possess domain experience to segment user profiles using machine learning. An embodiment of the present invention does not require knowledge of common or domain-specific attributes from the client, as segments are identified in an organic, data-driven fashion. In an embodiment of the present invention, the segment assignments are entirely data-driven, that is, they are done in an automatic, unsupervised manner, requiring no domain knowledge input from the client.

An embodiment of the present invention provides automatic segmentation of a set of user profiles to form subsets of users that share common attributes. More particularly, an embodiment of the present invention includes a method to automatically choose segments from profiles built on social media data, with the consequent segments representing a given number of attributes with corresponding confidence level. Thus, an embodiment of the present invention provides a comprehensive user segmentation method to segment user/customer profiles built on social media data, such that the resulting segments can generate value for businesses in any domain, as opposed to conventional techniques related to segmentation of users which are typically business-domain related.

These and other features and advantages of the present invention will become apparent from the following detailed description of illustrative embodiments thereof, which is to be read in connection with the accompanying drawings.

DETAILED DESCRIPTION

Figure 1:
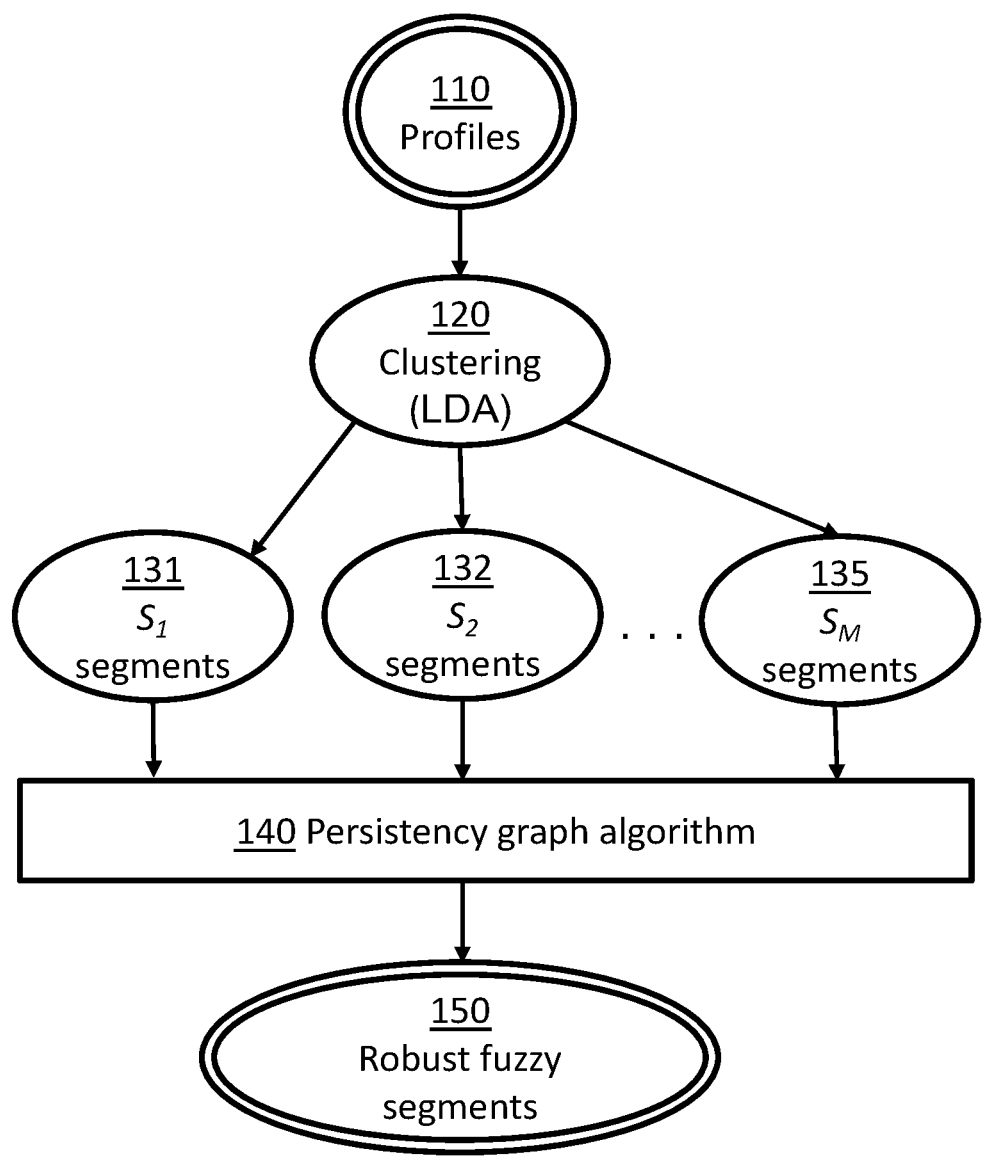
FIG. 1 shows an exemplary segmentation technique according to an illustrative embodiment of the present invention.

Although the inventive principles are primarily described herein with reference to profiles from social media data, the invention is not so limited and one skilled in the art will understand that inventive techniques may be applied to profiles from a number of industries. Preferably, the profiles are reported in matrix format. One skilled in the art will appreciate that inventive techniques may be advantageously applied to even extremely sparse matrices.

As used herein, profile segmentation generally refers to discovering groups of user profiles that share common attributes. Moreover, as used herein, a user profile generally refers to a set of attributes associated with a single unique user identifier. These attributes may be of any data type, including string, Boolean, numeric, etc.

As previously noted, although this is not a requirement of the present invention, the embodiments discussed herein assume that the data populating these profiles are derived from users' social media feeds. Such data can include not only data explicitly provided by users (e.g. screen name, location of residence) but also data extracted or inferred from their posts on social channels. Thus, user profiles may contain rich information regarding demographics, behaviors, attitudes, interests, and sentiments directed at any or all of these previous attributes. Segmenting profiles generated from social media data allows for business value across several industries.

In contrast to the aforementioned users associated with respective profiles, with a given profile being derived from data associated with a given user, a client as used herein refers to a party which executes (directly and/or indirectly, e.g., requesting a third-party service provider to execute) a method and/or system according to an illustrative embodiment of the claimed invention. The client may be an individual end-user and/or an entity including but not limited to a business entity such as a corporation, a non-profit organization, a trade association, and/or a social group. In an illustrative embodiment, the client may be a business (e.g., a social media site) and the users may be its customers. It should be noted that, in certain embodiments, the client may also be among the users (e.g., the client may be an owner and/or operator of a social media site who also maintains a user profile on the site, in a manner similar to Mark Zuckerberg of Facebook® or Jack Dorsey of Twitter®).

In an illustrative embodiment, the data is either Boolean (representing the presence or absence of an attribute) or numeric (representing the frequency with which a user exhibits an attribute). The total number of attributes for a profile dataset is typically very large, and consequently the individual profiles themselves are typically very sparse.

As used herein, a segment generally refers to a set of weights on the attributes describing the relative importance of each attribute in defining the segment. These weights may be understood as a categorical probability distribution over the set of attributes—an attribute's segment weight gives the probability of a user possessing that attribute, assuming that the user is in that segment. Thus, the segment is defined by confidence levels corresponding to the attributes of the profiles.

As used herein, a segment assignment is a number between 0 and 1 that represents the affinity of a user to a particular segment. Conventional segmentation techniques often provide hard or Boolean clusters, where the segment assignment is strictly 0 or 1, and each user profile is assigned to one and only one segment. However, illustrative embodiments of the present invention provide soft or fuzzy clusters, where each user may have some fractional affinity to any or all of the segments, and the sum of the segment assignments for a particular user is 1. Thus, an embodiment of the present invention is able to assign levels of confidence for segment membership. Furthermore, an embodiment of the present invention is able to report levels of confidence for each of the profile attributes within the segments.

Latent Dirichlet Allocation (LDA) is described in, for example, D. M. Blei et al., "Latent Dirichlet Allocation," Journal of Machine Learning Research, v. 3, p. 993-1022, 2003, which is incorporated by reference herein. Illustrative embodiments of the present invention discussed herein utilize LDA to learn segments from the data and create a membership model of users to segments. However, as would be understood by one skilled in the art, embodiments of the present invention may utilize other machine learning (e.g., unsupervised clustering) techniques in addition to and/or in place of LDA.

LDA is a probabilistic model developed in the field of topic modeling which attempts to model the semantic similarities and relationships between documents in a corpus. In the LDA framework, documents are extremely sparse collections of words in a large vocabulary of possible words. However, the mathematics behind LDA is general and its application is in no way restricted to natural language processing. LDA has been empirically shown to have superior performance than many other topic models, and many extensions to LDA have been developed to capture increasing levels of topical structure. Classic LDA as discussed in the aforementioned paper by Blei et al. expects an integer-valued input matrix, but simple extensions permit LDA to be used for real-valued inputs.

LDA typically suffers from some of the same practical and interpretative pitfalls as other conventional machine learning methods for clustering. Namely, a client must still select a number of segments and be able to interpret the fittingness of the results. Furthermore, exact inference in LDA is intractable, and thus the inference algorithms used are susceptible to local optima. In practice, this lack of robustness can lead to results that are inconsistent across several runs, presenting a further problem of interpretability to the client. An illustrative embodiment of the present invention advantageously compares the outputs of several runs of LDA on the same dataset to generate robust segments and segment assignments.

FIG. 1 shows an exemplary segmentation technique according to an illustrative embodiment of the present invention. In step 110, a profile dataset (e.g., social media user profiles) is received as input. Indeed, in an illustrative embodiment, no other input is required, as the system is able to make any necessary decisions to carry out the segmentation process. However, many of these decisions may be overridden by the client, if so desired. In an illustrative embodiment, membership in the user groups defined by segments is determined by unsupervised machine learning.

In step 120, a clustering technique (such as LDA) is run several (i.e., M) times on the same dataset (i.e., the profiles received in 110). M may be selected by the client, or the system may select a default number of iterations to run. In general, running the clustering algorithm more times will result in more robust results. There is however a tradeoff between accuracy and runtime—more iterations give better results but requires more resources (time and computation).

For $1 \leq i \leq M$, the ith run of step 120 produces segments $S_i$. Thus, the first run of step 120 produces segments $S_1$ 131, the second run of step 120 produces segments $S_2$ 132, and so forth until the Mth run of step 120 produces segments $S_M$ 135. Each run need not produce the same number of segments. The client may input the number(s) of segments to produce if desired, or the system may explore many numbers of segments to find an optimal fit (e.g., "follow the data" to determine the optimal number of segments).

Step 140 involves checking persistency of segments with similar attributes (as determined by a metric, e.g. Jensen-Shannon divergence) and corresponding attribute confidence levels, and then selecting segments that are persistent across multiple runs of step 120. In an illustrative embodiment, the quality of a cluster is predefined by a confidence level of attributes in the cluster, and is automatically achieved such that manual polling is not required in order to determine accuracy of the cluster.

Figure 2:
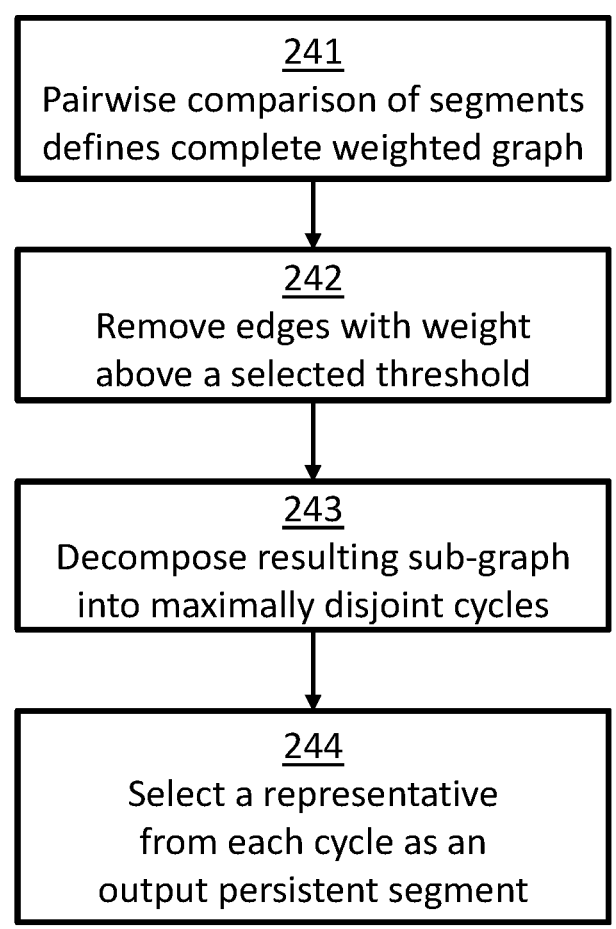
FIG. 2 shows an exemplary persistency graph algorithm in accordance with an illustrative embodiment of the present invention.

FIG. 2 shows an exemplary persistency graph algorithm in accordance with an illustrative embodiment of the present invention. In an illustrative embodiment, step 140 in FIG. 1 may involve performing algorithm 200 shown in FIG. 2. Algorithm 200 begins with step 241, which involves making pairwise comparisons between all segments 131, 132 . . . 135 (except between segments derived from the same run of step 120). Comparisons between two segments may be made using the Jensen-Shannon divergence dJS:

$$d_{JS}(S_{ij}, S_{kl}) = \sqrt{d_{KL}(S_{ij}; \overline{S}) + d_{KL}(S_{kl}; \overline{S})} \text{ where:}$$

the jth segment from run i is denoted Sij;
the kth segment from run l is denoted Sij;

$$\overline{S} = \frac{1}{2}(S_{ij} + S_{kl});$$

and
dKL( ) is the Kullback-Leibler divergence.

Jensen-Shannon and Kullback-Leibler divergences (and distances) are further described in, for example, J. Lin, "Divergence Measures Based on the Shannon Entropy," IEEE Transactions on Information Theory, v. 37, n. 1, January 1991, p. 145-151, which is incorporated by reference herein. One skilled in the art would understand that other metrics may be utilized in embodiments of the present invention in place of a Jensen-Shannon or Kullback-Leibler divergence or distance.

Given M runs of step 120, the aforementioned pairwise comparisons define a graph, which may be a complete weighted M-partite graph. The algorithm in step 140 (e.g., algorithm 200) then finds coherent clusters of segments, which are referred to herein as persistent segments, within this graph.

Step 242 removes edges with weight above a selected threshold, which may be chosen by the system according to a number of heuristics, or may be defined by the client. Step 243 decomposes the resulting sub-graph (i.e., after removal of edges in step 242) into maximally disjoint cycles. In step 244, a representative (e.g., a center) from each cycle is selected to be a persistent segment which is output in step 150. In an illustrative embodiments, the persistent segments are output in step 150 once specified coefficients of segment attribute persistence are achieved. The segments are created repetitively to achieve consistency in the attributes with a given confidence level, as well as consistency in the number of clusters that share those attributes.

As discussed above, the output in step 150 may be in the form of robust fuzzy segments rather than hard clusters. An illustrative embodiment of segmentation method 100 in FIG. 1 combines the results of multiple runs of LDA to automatically generate data-driven segments with given levels of confidence. The outputs of several individual runs of LDA are compared under a given metric and clustered using graph algorithms. Representatives (e.g., centers) from the detected clusters are given as the persistent segment output. These segments may be viewed as probability distributions over the set of profile attributes. An illustrative embodiment of the present invention eliminates the need for a client to possess domain experience to segment user profiles using machine learning. An illustrative embodiment of the present invention can select relevant attributes, discover data-driven segments, and assign users to these segments; no prior knowledge of existing customer segments is required from the client.

Figure 3:
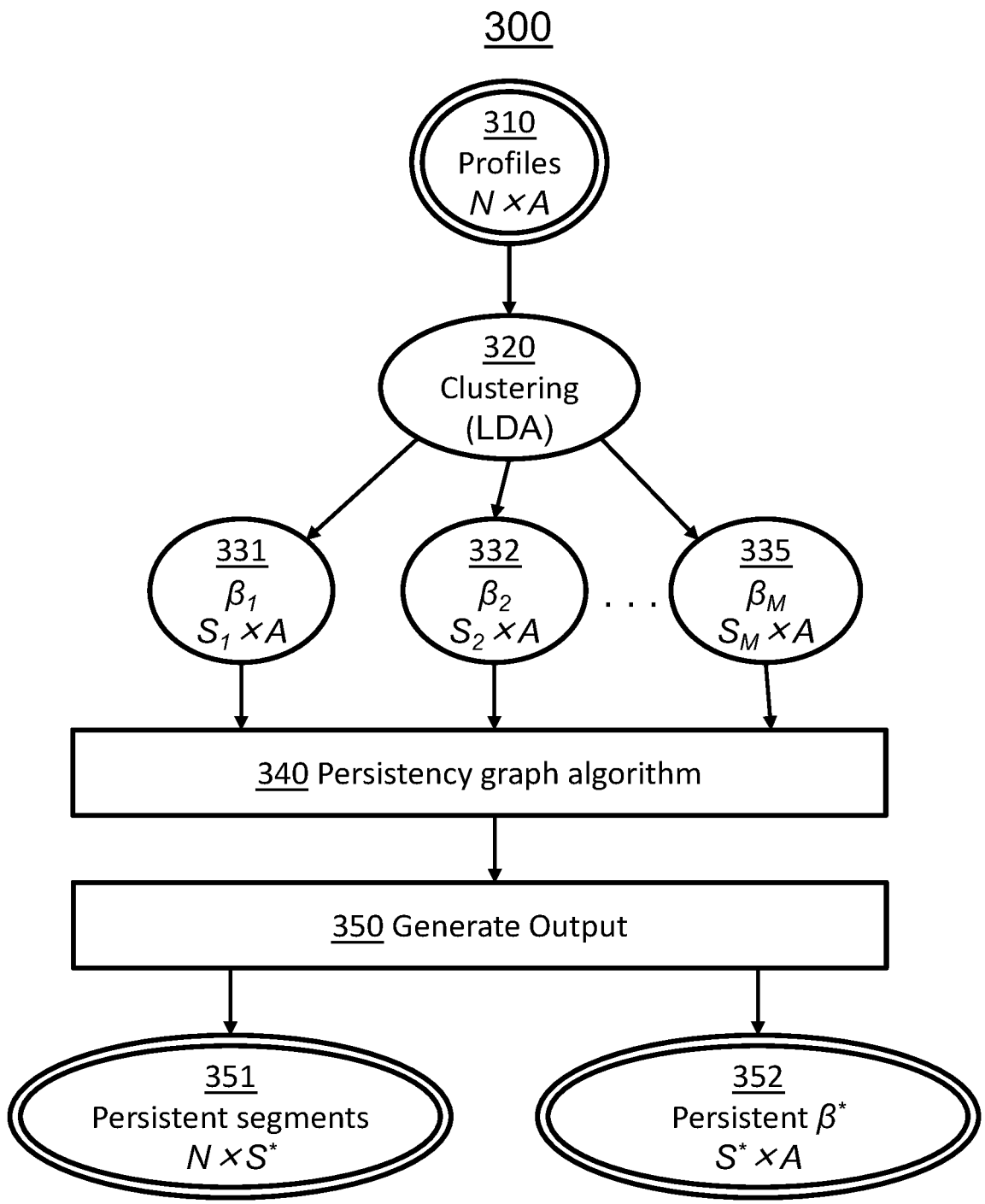
FIG. 3 shows an exemplary segmentation technique according to an illustrative embodiment of the present invention.

FIG. 3 shows an exemplary segmentation technique according to an illustrative embodiment of the present invention. The steps in FIG. 3 are analogous to the corresponding steps in FIG. 1. In fact, FIG. 3 may be viewed as a more detailed representation of FIG. 1. In step 310, a profile dataset (e.g., social media user profiles) is received as input. N is the number of profiles and A is the number of attributes: the dataset is an N×A matrix comprised of N profiles each having A attributes. Thus, the columns represent features and the rows represent data points. (As noted above, LDA originally expected an integer-valued matrix, but has since been extended to real-valued matrices.)

As discussed above with reference to step 110 in FIG. 1, no other input is required, but the client may optionally provide additional input if desired. For example, the client may select a desired number of clusters if they have a priori knowledge of an optimal segmentation: the client could provide S* indicating a desired number of clusters and/or segments to be output, preferably S*<<N. However, this is often not the case in practice and therefore the client is not required to input a number of clusters; rather, the algorithm can determine an optimal number of clusters in a data-driven manner.

In step 320, as in step 120, a clustering technique (such as LDA) is run several (i.e., M) times on the same dataset (i.e., the profiles received in 310). For $1 \leq i \leq M$, the ith run of step 220 computes $\beta_i$ representing segment definitions as probability vectors for Si segments over the set of A attributes. Thus, the first run of step 320 produces segment definitions $\beta_1$ for $S_1$ segments over A attributes (331), the second run of step 320 produces segment definitions $\beta_2$ for $S_2$ segments over A attributes (332), and so forth until the Mth run of step 320 produces segment definitions $\beta_M$ for $S_M$ segments over A attributes (335).

Step 340 is similar to step 140 in FIG. 1 and may involve performing algorithm 200 shown in FIG. 2. Step 340 may utilize any metric suitable for comparing rows of the S*×A matrix produced by clustering technique 320. Step 340 produces S* persistent segments, which may be robust fuzzy segments similar to those discussed above with reference to step 150 in FIG. 1, preferably with S*<<N. Step 350 outputs these persistent segments in the form of both persistent segment definitions β* 352 and corresponding user-segment assignments 351. As discussed above with reference to step 150 in FIG. 1, in an illustrative embodiment, the persistent segments are output in step 350 once specified coefficients of segment attribute persistence are achieved. Output 351 may include S* persistent segment assignments for each of the N user profiles. Output 351 may be in the form of an N×S* matrix, where columns represent clusters and rows are mixture weights of the clusters that represent membership/affinity of each data point to each cluster. Output 352 may include S* persistent segment definitions for each of the A user attributes. Output 352 may be in the form of a S*×A matrix, where columns represent the features and rows are mixture weights of the features that represent cluster centers/exemplars.

In an illustrative embodiment, the segment descriptions generated by methods 100 or 300 can be used to aid in the development of marketing personae, which involves describing, in high detail, the different types of typical consumers of a product. The segment assignments can be used to partition the original dataset into (potentially overlapping) subgroups, which can then be analyzed or further monitored to gain insight into product development or content management. An embodiment of the present invention generates user subsets which can be used for a more detailed analysis of a large audience of users, as an aid in the development of marketing personae, or as virtual focus groups for product development or content management, among other uses.

Figure 4:
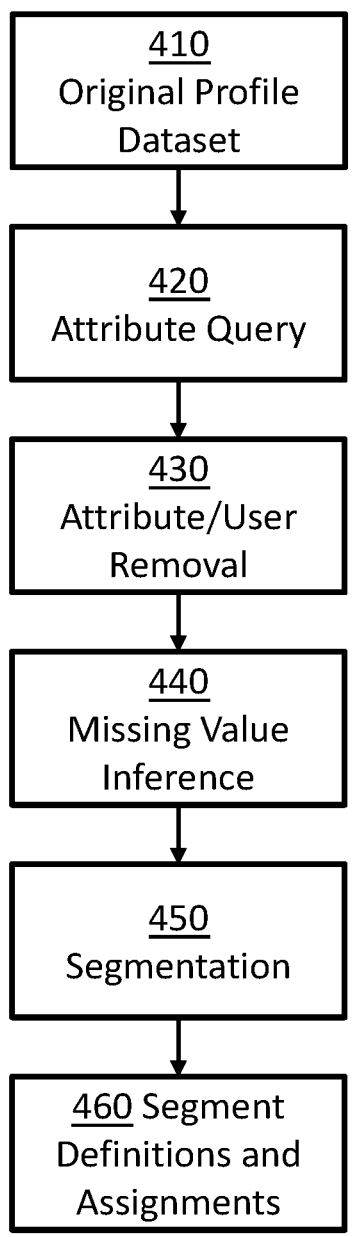
FIG. 4 shows an exemplary method including preprocessing according to an illustrative embodiment of the present invention.

An illustrative embodiment of the present invention may include performing additional operations prior to segmentation (e.g., prior to executing algorithms 100 or 300). This preprocessing may improve the quality and/or performance of the segmentation process. FIG. 4 shows an exemplary method including preprocessing according to an illustrative embodiment of the present invention. Each of the preprocessing steps shown in FIG. 4 are optional, and a given embodiment may omit one or more these steps. Method 400 begins with the original profile dataset 410.

In step 420, a client may execute a query on the dataset 410 to find a subset of profiles having one or more specified attributes (e.g., only female users between the ages of 18 and 35); the segmentation can then be performed solely on the selected subset (i.e., only the profiles which satisfy the client-defined criteria) rather than the entire dataset. In an illustrative embodiment, the system will not decide to perform segmentation on a subset of the profiles without the client specifying the subset. Segments can additionally and/or alternatively be derived from the data using machine learning methods in which explicit logical expressions and/or rules are not required.

Additionally or alternatively, it may be desirable to reduce the overall sparsity of the profile dataset prior to segmentation, which may include step 430 and/or step 440. Step 430 involves reducing sparsity according to heuristic methods, such as removing user profiles which contain a number of attributes less than a threshold and/or removing attributes that too many users possess. Additionally or alternatively, step 440 involves reducing sparsity according to machine learning techniques, such as inferring missing attributes using collaborative filtering. These decisions may be made automatically by the system or may be defined by the client. Step 450 involves performing segmentation, e.g. according to method 100 in FIG. 1 and/or method 300 in FIG. 3. Step 460 concludes with segment definitions (e.g., 352) and assignments (e.g., 351).

Figure 5:
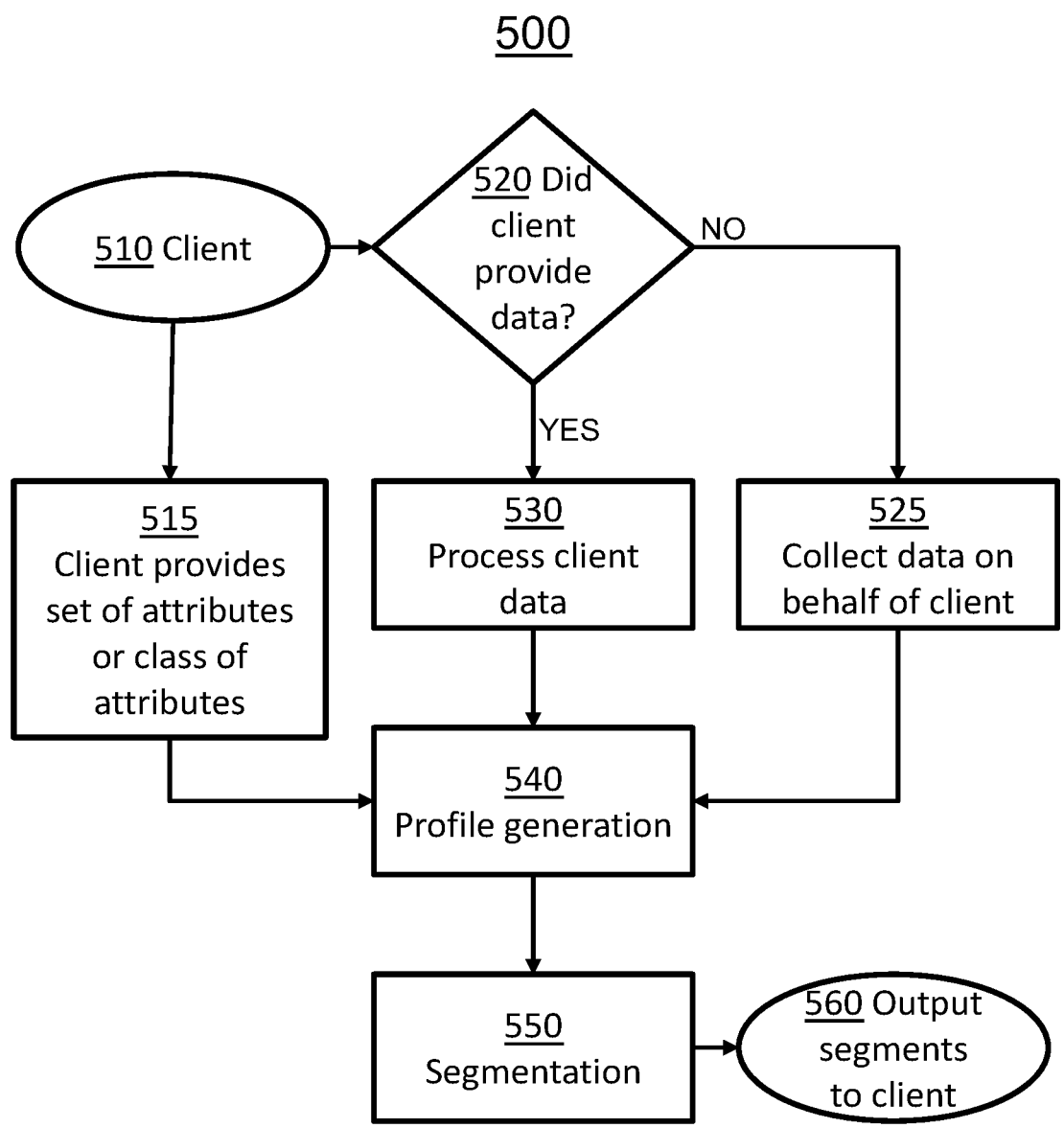
FIG. 5 shows an exemplary method including generation of profiles according to an illustrative embodiment of the present invention.

An illustrative embodiment of the present invention uses profiles that are pre-made but rather are automatically generated from social media data. FIG. 5 shows an exemplary method including generation of profiles according to an illustrative embodiment of the present invention. As previously discussed, client 510 is an interested party, which may be an individual and/or an entity such as a corporation, trade association, or social group. Step 520 determines whether or not the client has provided data associated with users. In an illustrative embodiment, this data may be social media data. However, as discussed above, principles of the present invention may be applicable to other data.

If step 520 determines that the client has provided user data, the data is processed in step 530, which may include aggregation to combine posts from social media users, for example. If step 520 determines that the client has not provided user data, then step 525 collects user data on behalf of the client, e.g., from one or more social media platforms.

In addition to the aforementioned data, the client provides a set of low-level attributes or high-level class(es) of attributes in step 515. The client may provide a set of low-level attributes which may include, e.g., one or more behavioral, demographic or interest attributes. These attributes (e.g., gender, specific books and movies, specific hobbies and activities, etc.) may be organized in at least one taxonomy. The client may access this taxonomy to control attributes to be included during segmentation based on their domain knowledge if desired, but this is not required. For example, the client has the ability to select one or more branches of the taxonomy for inclusion in segmentation.

Additionally or alternatively, the client may provide high-level classes of attributes that are determined to be of interest based on the business context for performing segmentation. For example, a client who wants to co-market two brands may place higher priority on customers' interests and have no need to segment on customer demographics; in this case the client would indicate to the system that the attributes should include interests but not demographics, without needing to indicate specific interests. However, in an illustrative embodiment, membership in the user groups defined by segments may be determined by unsupervised machine learning, so there is no need for a client to provide the system with additional information (e.g., classes and/or taxonomies) for defining attributes.

Step 540 processes the data (from step 525 and/or step 530) and the attributes (from step 515) to generate a set of profiles (e.g., 110 in FIG. 1, 310 in FIG. 3, and/or 410 in FIG. 4). Similar to step 450 in FIG. 4, step 550 performs segmentation, e.g., according to method 100 in FIG. 1 and/or method 300 in FIG. 3. Step 560 concludes with outputting the segments to the client in a manner similar to step 150 in FIG. 1, 350 in FIG. 3, and/or 460 in FIG. 4.

Figure 6:
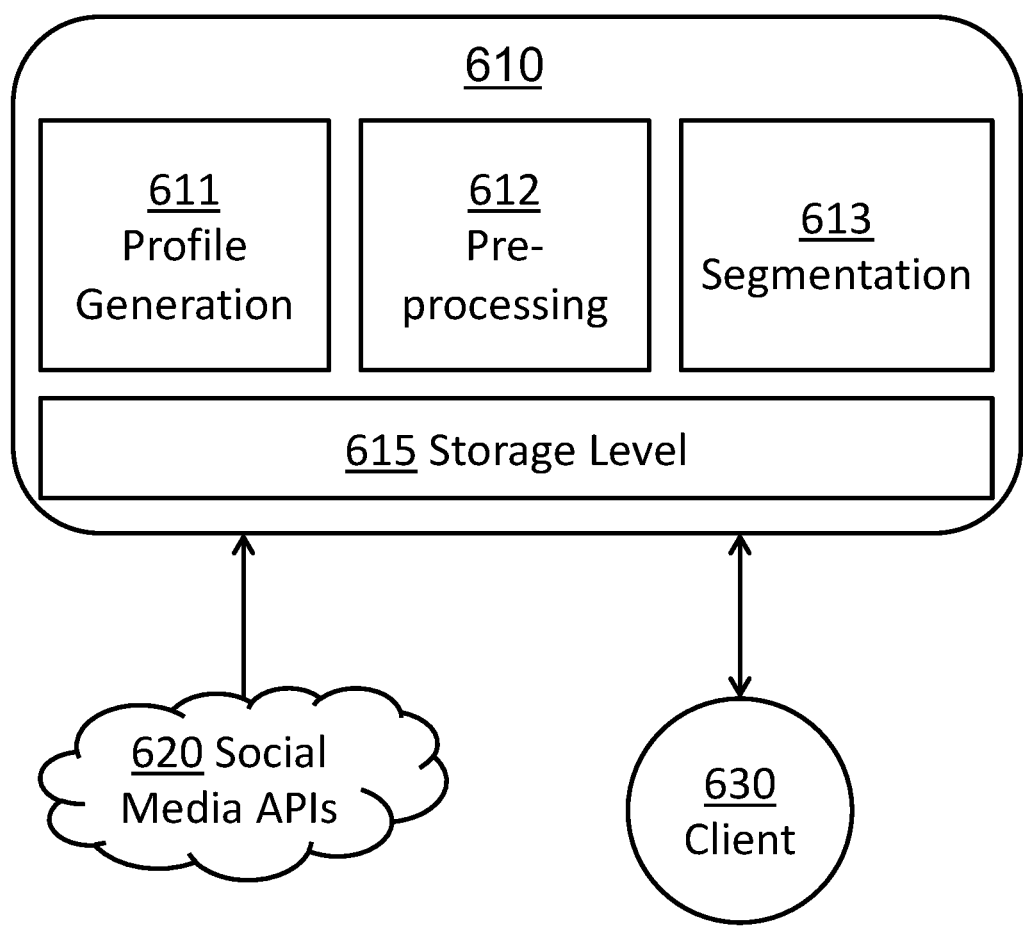
FIG. 6 shows an exemplary deployment of an illustrative embodiment of the present invention.

FIG. 6 shows an exemplary deployment 600 of an illustrative embodiment of the present invention. System 610 includes modules operable to perform profile generation 611 (e.g., according to method 500 in FIG. 5), pre-processing 612 (e.g., according to method 400 in FIG. 4), and segmentation 613 (e.g., according to method 100 in FIG. 1 and/or method 300 in FIG. 3), as well as storage level 615. System 610 is operative to receive input from client 630, such as criteria and/or thresholds, which may be utilized by components 611, 612 and/or 613, as discussed above. System 610 receives data (e.g., social media posts) from social media application program interfaces (APIs) 620. As discussed above with reference to FIG. 5, this data may be provided by a client (e.g., 530) and/or collected by system 610 on behalf of the client (e.g., 525).

Profile generation module 611 processes the data from APIs 620 according to method 500 in FIG. 5, and generates a set of user profiles. Preprocessing module 612 processes the set of user profiles according to method 400 in FIG. 4 and creates a subset of the user profiles. Segmentation module 613 processes this subset of segments according to method 100 in FIG. 1 and/or method 300 in FIG. 3, and generates persistent segments. These persistent segments may be provided (e.g., transmitted and/or displayed) to client 630 and/or written to storage level 615.

An illustrative embodiment according to FIG. 6 provides a complete end-to-end system which includes all aspects of the profile segmentation process, such as: ingestion of raw data (e.g., from 620), ingesting any given set of profile attributes (e.g., from 630), generating profiles (e.g., 611), storing the profiles (e.g., 615), assessment of the profiles for segmentation (e.g., 612), automatically segmenting profiles into persistent groups (e.g., 613), and reporting (e.g., to 630). An illustrative embodiment of the present invention provides automatic segmentation of a set of user profiles to form subsets of users that share common attributes (e.g., to automatically discover a group of users with similar behaviors and/or demographics). These user subsets can be used for a more detailed analysis of a large audience of users, as an aid in the development of marketing personae, and/or as virtual focus groups for product development or content management, among other uses.

In an illustrative embodiment, the segment assignments are entirely data-driven: they are done in an automatic, unsupervised manner, requiring no domain knowledge input from the client (i.e., the user of the system). In an illustrative embodiment of the present invention, because segments are discovered in a data-driven manner, an end-user client can explore the profile data set prior to creating or presenting content. Moreover, an illustrative embodiment including a data-driven method is able to capture complex relationships between attributes—e.g. positive and negative correlations, as opposed to strict co-occurrence—and does so in an automatic fashion, without prior knowledge of existing segments/profile groups from the end-user client.

Given the discussion thus far, it will be appreciated that, in general terms, an aspect of the invention includes a method (e.g., 100 in FIG. 1, 300 in FIG. 3, 400 in FIG. 4, and/or 500 in FIG. 5) for generating an output comprising one or more segments (e.g., 150 in FIG. 1, 351 in FIG. 3, 460 in FIG. 4 and/or 560 in FIG. 5). The method includes obtaining a plurality of profiles (e.g., 110 in FIG. 1, 310 in FIG. 1, 410 in FIG. 4 and/or 540 in FIG. 4) derived from unstructured data (e.g., 520 and/or 525 in FIG. 5) associated with a plurality of users, wherein a given one of the profiles corresponds to a respective one of the users. The method also includes repetitively executing at least one machine learning technique (e.g., 120 in FIG. 1 and/or 320 in FIG. 3) on the plurality of profiles, each execution producing a respective set of one or more segments (e.g., 131, 132, 135 in FIG. 1 and/or 331, 332, 335 in FIG. 3) from the plurality of profiles. The method further includes generating a graph (e.g., 241 in FIG. 2) by performing pairwise comparisons between sets of segments from respective executions. The method also includes applying at least one persistency graph algorithm (e.g., 140 in FIG. 1 and/or 340 in FIG. 3) to the graph to find one or more coherent clusters (e.g., 243 in FIG. 2) comprising one or more segments that are persistent across the repetitive executions of the machine learning technique. The method further includes producing the output at least in part by selecting at least one of the segments (e.g., 244 in FIG. 2) from at least one of the coherent clusters.

One or more embodiments of the invention, or elements thereof, can be implemented, at least in part, in the form of an apparatus including a memory and at least one processor that is coupled to the memory and operative to perform exemplary method steps.

Figure 7:
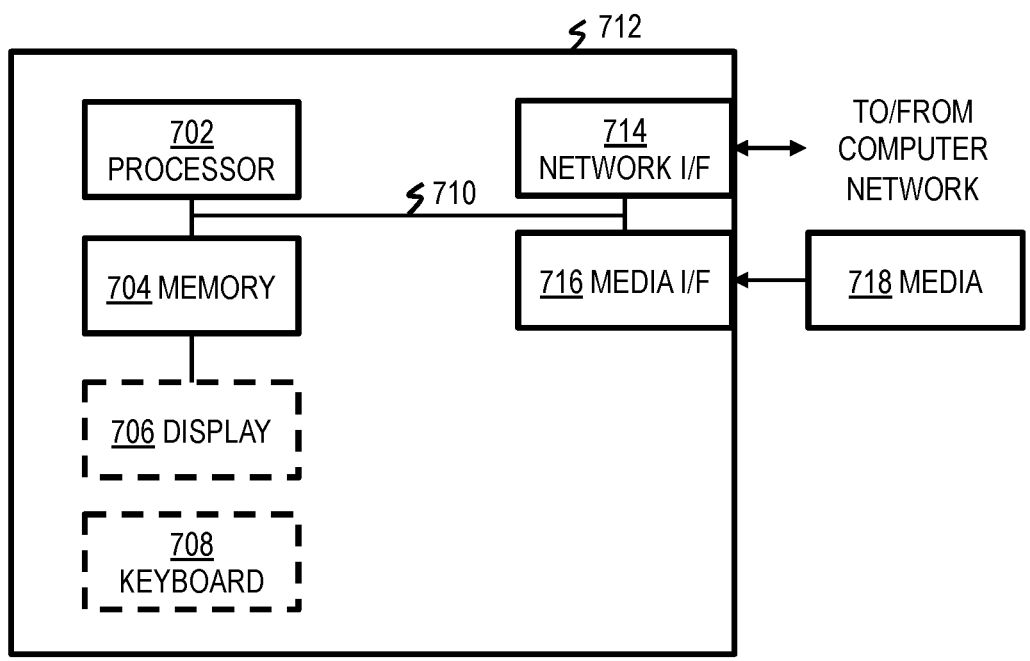
FIG. 7 depicts a computer system that may be useful in implementing one or more aspects and/or elements of the invention.

One or more embodiments can make use of software running on a general purpose computer or workstation 700. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use in generating an output comprising one or more segments, the method comprising:
    obtaining a plurality of user profiles derived from unstructured data associated with a plurality of users, wherein a given one of the user profiles corresponds to a respective one of the users;
    repetitively executing at least one machine learning technique on the plurality of user profiles, each execution producing a respective set of one or more segments from the plurality of user profiles, wherein each segment is a collection of users having common attributes;
    generating a graph by performing pairwise comparisons between collections of users having common attributes from respective executions;
    applying at least one persistency graph algorithm to the graph to find one or more coherent clusters comprising one or more collections of users having common attributes that are persistent across the repetitive executions of the machine learning technique; and
    producing the output at least in part by selecting at least one of the collections of users having common attributes from at least one of the coherent clusters.

2. The method of claim 1, wherein the machine learning technique comprises an unsupervised clustering technique.

3. The method of claim 1, wherein the machine learning technique comprises Latent Dirichlet Allocation.

4. The method of claim 1, wherein a given pairwise comparison comprises calculating a measurement between respective segments in respective sets from respective executions.

5. The method of claim 1, wherein the machine learning technique is operative:
    to learn the one or more collections of users having common attributes from the user profiles; and
    to create a membership model of the users to the one or more collections of users having common attributes.

6. The method of claim 1, wherein the one or more collections of users having common attributes in the output comprise fuzzy collections of users having common attributes.

7. The method of claim 1, wherein the output comprises one or more persistent segment definitions and one or more corresponding user-segment assignments.

8. The method of claim 1, wherein the graph comprises a complete weighted graph; and wherein the persistency graph algorithm comprises:
    removing one or more edges with weights above a threshold from the complete weighted graph to produce a sub-graph; and
    decomposing the sub-graph into one or more maximally disjoint cycles representing the one or more coherent clusters.

9. The method of claim 1, wherein the unstructured data comprises one or more social media feeds, and wherein the user profiles comprise respective social media user profiles.

10. The method of claim 1, further comprising the steps of:
    obtaining the unstructured data associated with the plurality of users; and
    deriving the plurality of user profiles from the unstructured data.

11. The method of claim 10, wherein the unstructured data is obtained from one or more social media application program interfaces.

12. The method of claim 1, wherein the plurality of user profiles is a subset of a set of user profiles derived from the unstructured data, the subset comprising members of the set which satisfy one or more criteria specified by an end-user client.

13. The method of claim 1, further comprising reducing the sparsity of the plurality of user profiles prior to repetitively performing the repetitive execution of the at least one machine learning technique.

14. The method of claim 13, wherein reducing the sparsity comprises at least one of:

removing one or more user profiles which include an insufficient number of attributes; and removing one or more attributes included in an excessive number of user profiles;

wherein said insufficient number and said excessive number are determined based on respective heuristics.

15. The method of claim 1, wherein the output comprises a plurality of collections of users having common attributes, wherein the common attributes comprise one or more of behavioral attributes, demographic attributes and interest attributes, and wherein two or more of the output collections of users having common attributes each include a given user profile.

16. The method of claim 1, wherein domain knowledge input is not required.

17. The method of claim 1, wherein a given one of the user profiles comprises one or more values respectively corresponding to one or more attributes; and wherein a given one of the one or more collections of users having common attributes comprises one or more confidence levels respectively corresponding to the one or more attributes.

18. The method of claim 1, wherein selecting at least one of the collections users having common attributes from at least one of the coherent clusters comprises selecting at least one collection of users having common attributes from each of the coherent clusters.

19. The method of claim 1, wherein selecting at least one of the collections users having common attributes from at least one of the coherent clusters comprises selecting one collection of users having common attributes from each of the coherent clusters.

\* \* \* \* \*